No. 863,928. PATENTED AUG. 20, 1907.
A. C. LEININGER.
SHAFT COUPLING.
APPLICATION FILED APR. 20, 1907.
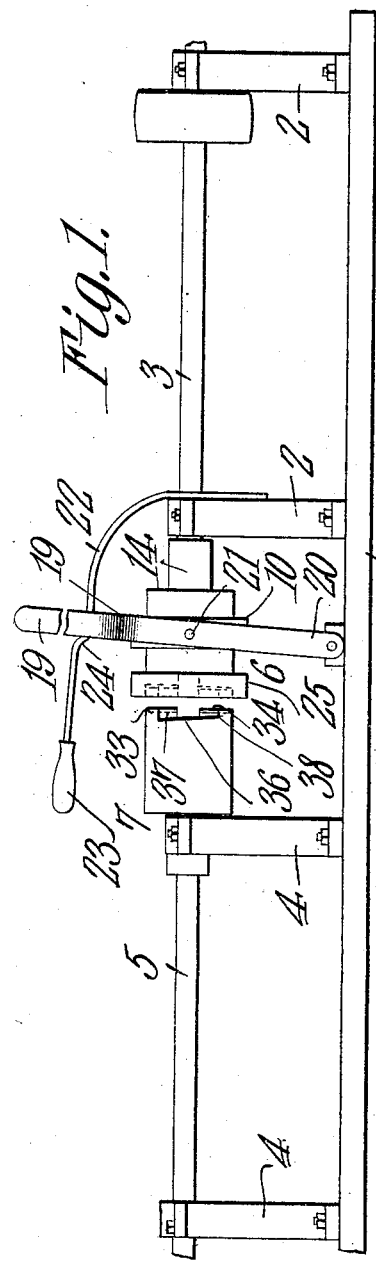
WITNESSES: Anton C. Leininger, INVENTOR
By C. A. Snow & Co.
ATTORNEYS

UNITED STATES PATENT OFFICE.

ANTON C. LEININGER, OF DE PERE, WISCONSIN.

SHAFT-COUPLING.

No. 863,928.  Specification of Letters Patent.  Patented Aug. 20, 1907.

Application filed April 20, 1907. Serial No. 369,297.

*To all whom it may concern:*

Be it known that I, ANTON C. LEININGER, a citizen of the United States, residing at De Pere, in the county of Brown and State of Wisconsin, have invented a new and useful Shaft-Coupling, of which the following is a specification.

This invention relates to a means for coupling a continuously running shaft with an intermittently rotating shaft, the object being to produce a coupling mechanism of simple design, positive action and which shall unite two shafts with less shock than other forms of shaft coupling.

In the accompanying drawings, Figure 1 is an elevation of two shafts provided with the improved shaft coupling, disconnected. Fig. 2 is a vertical longitudinal sectional view, enlarged, of the two coupling members in operative position. Fig. 3 is a perspective view of the two coupling members separated to show the connecting faces.

Similar numerals of reference indicate the same parts in all the figures.

On any suitable base 1 are secured a suitable number of bearings 2 for the driving shaft 3, other bearings 4 give support to the driven shaft 5. The two shafts 3 and 5 are placed in the same axial line as shown but separated from each other at their ends.

Slidably mounted on the driving shaft 3 is a coupling member 6, facing a second coupling member 7 keyed fast on the end of the driven shaft 5. The coupling member 6 is provided with a hub 8 having a peripheral groove 9 for a ring 10, here shown as a two-part ring, each part having a lug 11 at each end which, when the parts are placed in the groove 9, are united by bolts or screws 12. Fixed to the driving shaft 2 by a key 13 is a tubular bearing and abutment 14 which easily enters a cylindrical longitudinal opening 15 in the member 6 of greater diameter than the shaft 3. The opening does not extend entirely through the member 6 at this excess diameter, but near the inner end its diameter is reduced as at 16 to that of the shaft 3 on which it is adapted to slide in a longitudinal direction. Feathers 17 connect the member 6 with the shaft to insure its rotation therewith, but permit its endwise movement. The end of the abutment 14 always remains within the opening 15, and thus serves as a bearing for the outer end of the hub. A spiral spring 18 is placed within the opening 15 and bears against the inner end of the abutment and the bottom of the opening to cause the member 6 to move toward the end of the driving shaft when unrestrained.

A hand lever 19 with forked ends 20 is pivoted by said forked ends to the base 1 and is provided with pins 21 seated in sockets in the ring 10 in well known manner.

A spring catch 22 fastened to one of the bearings 2 curves over the member 6 and, after passing through an opening in the hand lever 6, is furnished with a handle 23 for operating the spring catch. An offset 24 is formed on the spring catch to hold the hand lever when it has been moved to disengage the member 6 from the member 7. A flange 25 surrounds the outer end of the member 6 and is recessed as at 26 on its outer side to admit the end of the member 7 on the driven shaft. Within the circular recess 26 are formed a plurality of lugs, two being shown in the drawing and numbered 27 and 28. Between the lugs 27 and 28 are two depressions 29 and 30. Each lug, in the construction shown, occupies a space of ninety degrees or one-fourth the circumference of the recess. The depressions are of equal extent. The faces of the lugs 27 and 28 are inclined to the plane of the face of the flange, as are the depressions 29 and 30. The inclined faces of the lugs and depressions bear such relation to each other that one edge 31 of each lug stands a greater distance above the depressions than the other edge 32, the purpose of this construction will be described later.

The member 7 is cylindrical in shape and has at its inner end a diameter such as will enter the recess 26 in the member 6, and on the face of said end are two projecting lugs 33 and 34 adapted to enter the depressions 29 and 30 when the members are in engagement. The lugs 33 and 34 are of the same size as the depressions 29 and 30 and have their faces beveled at the same angle as the bottoms of the depressions. The face of the member 7 between the lugs 33 and 34 is also beveled as at 35 and 36 in the same angular planes as the lugs 27 and 28 on the member 6. The edges 37 and 38 of each lug 33 and 34 on the member 7 has the same width as the corresponding edges 31 and 32 of the lugs 27 and 28 on the member 6. As thus constructed when the member 6 is brought into contact with member 7, the lugs on each member will most probably strike first and the inclined faces of the lugs on the member 1 will slide over the similarly inclined faces of the lugs on the member 7 until the said lugs arrive opposite the spaces between opposite lugs when, under the force of the hand lever 19 or spring 18, the lugs enter the spaces and the edges 31 and 37 engage and rotate the shaft 5. Should it be necessary to revolve the shaft 3 in the opposite direction the narrow edges 32 of the lugs 27 and 28 will engage the narrow edges 38 of the lugs 33 and 34 and oppositely rotate the shaft 5.

When the hand lever 19 is moved to the position represented in Fig. 1, the offset 24 on the spring catch 22 will hold it in the position indicated, with the member 6 out of engagement and the spring 18 under compression. If the hand lever be moved sufficiently far to pass the offset, or the spring catch depressed to release the lever, the spiral spring 18 will immediately force the clutch member 6 toward and into engagement with the clutch member 7.

When the driving shaft is traveling in its normal direction the broader edges 31 and 37 of the respective clutch members 6 and 7 are in engagement and hold with great firmness, but if the driving shaft be reversed, as in automobiles, and auto-boats, the narrow edges 32 and 38 of said clutch members will engage with a sufficient degree of firmness to rotate the driven shaft backwards.

Having thus described the invention what is claimed is:—

1. The combination of a continuously rotating shaft and an intermittently rotating shaft in axial line, a clutch member fixed to one shaft, an abutment bearing keyed to the other shaft, and a second clutch member having a bore at its forward end slidable on its shaft and a larger bore in its rear end to slide on said abutment bearing, and a spring in the larger bore bearing against the abutment and tending to move the sliding clutch member towards the fixed clutch member.

2. The combination of a continuously rotating shaft, and an intermittently rotating shaft in axial line, a clutch member fixed to one shaft, an abutment bearing keyed to the other shaft, a second clutch member feathered on the end of the second shaft and slidable longitudinally thereon and on said abutment bearing, a spring within said second clutch member seated against said abutment bearing and tending to move said second clutch member towards the first clutch member, and an operating lever for said second clutch member.

In testimony that I claim the foregoing as my own, I have hereto affixed my signature in the presence of two witnesses.

ANTON C. LEININGER.

Witnesses:
F. A. McDONALD,
M. J. MAES.